(No Model.)
L. A. HAGAN.
DEVICE FOR COPYING PICTURES.
No. 464,359. Patented Dec. 1, 1891.
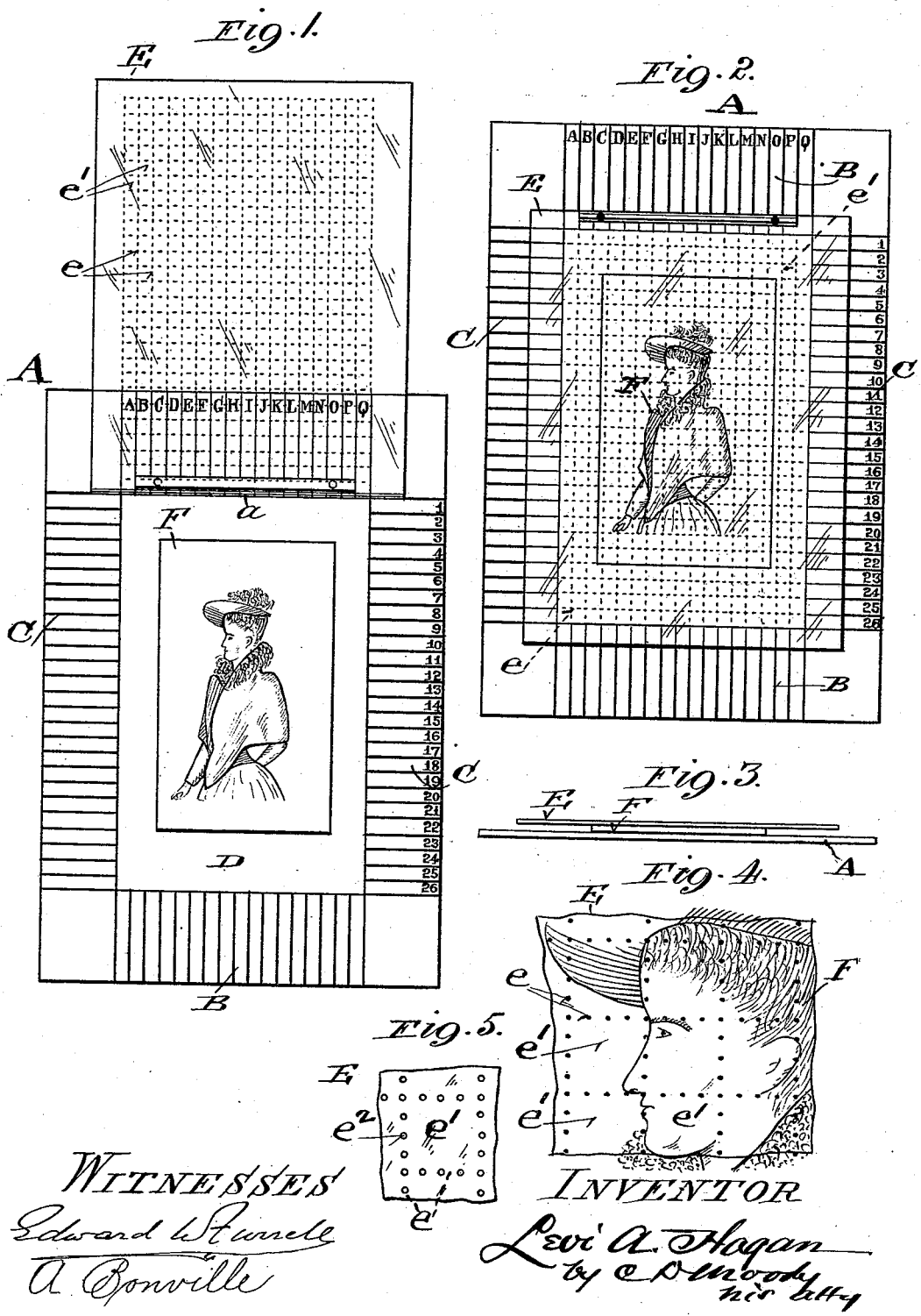

UNITED STATES PATENT OFFICE.

LEVI A. HAGAN, OF LITTLE ROCK, ARKANSAS, ASSIGNOR OF ONE-HALF TO JAMES E. BARRETT, OF MEMPHIS, TENNESSEE.

DEVICE FOR COPYING PICTURES.

SPECIFICATION forming part of Letters Patent No. 464,359, dated December 1, 1891.

Application filed December 29, 1890. Serial No. 376,120. (No model.)

*To all whom it may concern:*

Be it known that I, LEVI A. HAGAN, of Little Rock, Arkansas, have made a new and useful Improvement in Devices for Copying Pictures, of which the following is a full, clear, and exact description.

Devices for copying pictures have heretofore been used consisting substantially of a tablet and a transparent sheet, as follows: The marginal portion of the tablet is provided with a vertical and a horizontal graduation, leaving the interior portion to be occupied by the picture being copied. The picture being in place, the transparent sheet, which by means of lines drawn thereon, is marked off into squares whose sides coincide, respectively, with the graduations of the tablet is placed above the picture, and any suitable means are employed to confine the picture and sheet in place upon the tablet. The sheet being transparent, the picture can be seen, and the squares of the sheet serve for the time being to mark the picture and to thereby guide the copyist in his work. The paper upon which the copy is made is similarly marked in squares either of the same size or larger or smaller, as may be desired, and the work is readily and accurately performed by reference to the corresponding squares indicated upon the picture by means of the lined transparent sheet.

The present improvement is related to the described device in that a similarly-graduated tablet for holding the picture is employed; but, in place of a transparent sheet having squares produced thereon by means of continuous lines, I use a transparent sheet having spaces which are outlined by means of points only, for a sheet ruled with continuous lines, as described, is frequently objectionable, in that the lines obscure important features of the work being copied. In copying a photograph of a face, for instance, the lines may pass over minute features, say, in or about the eyes or mouth, so as to materially conceal them from view. I overcome the difficulty referred to by substituting points in the place of continuous lines in locating the spaces upon the transparent sheet. The points not only occupy much less room and thus leave a larger portion of the sheet transparent, but they also enable the spaces to be outlined upon the sheet not only by printing dots upon the upper surface of the sheet, but also by perforating the sheet, all substantially as is hereinafter set forth and claimed, aided by the annexed drawings, making part of this specification, in which—

Figure 1 is a face view of the improved device, the transparent sheet being raised to uncover the picture; Fig. 2, a similar view, the picture and transparent sheet being in position for use; Fig. 3, an end edge elevation of the same; Fig. 4, a detail, being an enlarged view showing a portion of the transparent sheet and the picture to be copied behind it; and Fig. 5 a similar view showing perforations.

The same letters of reference denote the same parts.

A represents the tablet.

B represents the vertical graduation.

C represents the horizontal graduation, and D is the space occupied by the picture.

E represents the transparent sheet. It is preferably of celluloid or zylonite. Its spaces, formed by means of the rows $e\ e$ of points are shown at $e'\ e'$. The sheet may be entirely detachable from the tablet, but it is better to permanently secure it to the tablet by means of any suitable fastening, such as the strip $a$, and so that the sheet can be upturned, as in Fig. 1, to uncover the central portion of the tablet or to be turned down, as in Fig. 2, to bring its spaces accurately into coincidence with the lines of the tablet-graduations.

In operation a picture F is confined upon the tablet beneath the transparent sheet, as indicated in Fig. 2. The sheet upon which the copy is made is not shown. It is of any suitable character for the purpose in question, with spaces indicated thereon corresponding to those upon the transparent sheet. In producing the spaces in question I preferably employ five points at each side of a space— that is, besides the four points at the corners, respectively, of the space there are three points in each side of the space, substantially as shown in Figs. 4 and 5.

In carrying out the improvement I desire not to be confined to squares, as spaces of other forms can, in the manner described and for the purpose under consideration, be outlined upon the transparent sheet, and the tablet, and also the sheet upon which the copy is made can be made to conform thereto. The perforations $e^2$, Fig. 5, used to form the rows $e$ serve not only as points for indicating the lines of the spaces, but also enable those portions of the picture which come beneath the perforation to be directly visible to the operator.

I am aware that a stencil for stamping a design for embroidery has been provided with arbitrary symbols perforated therein within the lines of its design, and such, therefore, I disclaim.

I do not wish to be understood as broadly claiming a picture-copying device having a transparent sheet provided with continuous lines running at right angles to each other to constitute numerous squares, as such is disclosed in Letters Patent No. 241,801, issued to me May 24, 1881, and No. 275,822, issued to me April 17, 1883.

In the prior constructions the squares are formed by ruled lines, the corners only of the squares serving the purpose of designating points to guide the eye and hand in reproducing a picture on a larger scale. The continuous lines, printed or ruled, are objectionable, in that they cross the features, cover up, hide from view, and totally obscure many delicate lines, shadows, features, or expressions of the face, thus defeating, in a large degree, the object for which the subdivided transparent sheet is intended.

The essential object of my present invention is to avoid the objections stated, whereby all the delicate lines, shadows, and features visible on a small photograph are not partially or in any way hidden from the view of the operator, but are clearly visible between the separated points or dots, thereby enabling the operator to draw every line and feature. The printed or ruled continuous lines forming squares constitute only four specific points for the guidance of the untrained and unskilled hand and eye of the beginner or learner, thus leaving the proportions of the distance between the corners to be obtained only by guess-work. To obviate this I devised the construction hereinbefore described, whereby the spaces are subdivided and serve the untrained mind in making correct proportional and mental calculations, resulting in a larger degree of accuracy in the enlarged copy, and encouraging the beginner or learner by giving the exact proportions.

The dotted spaces show three specific points to each side of a square, and thus serve as proportional points in addition to the corners, making twelve specific unvarying and unerring proportional or calculating points to each square, instead of merely four corners, as heretofore.

The squares formed by continuous lines have four specific points only; but the squares formed by the dots or points in accordance with my present invention provide each square with twelve points in addition to the corners, thereby materially facilitating the work of copying small photographs, while leaving the delicate lines, shadows, and expressions of the features plainly visible to the eye, which is a result impossible with squares formed by ruled or printed continuous lines.

In my present invention the transparent dotted sheet is permanently fastened at one edge to the tablet in such manner that the transparent sheet can be turned up for uncovering the central portion of the tablet.

I claim—

1. As an improved article of manufacture, a photograph-copying device having an attached transparent sheet subdivided into squares, the outlines of which are formed of separated points or dots for rendering all portions of the delicates lines, shadows, and features of the face clearly visible, substantially as described.

2. The combination, in a photograph-copying device, of a tablet with a transparent sheet permanently attached to the tablet at one edge and subdivided into squares, the outlines of which are formed by separated points or dots for the purpose of providing each square with several specific and unitary points in addition to the corner points, so that all portions of the delicate lines, shadows, and expressions of the features are clearly visible to the eye, substantially as described.

LEVI A. HAGAN.

Witnesses:
H. F. ROBERTS,
H. TIMMERMAN.